(12) United States Patent
Umarov et al.

(10) Patent No.: US 9,581,143 B2
(45) Date of Patent: Feb. 28, 2017

(54) METHOD FOR CONVERTING THERMAL ENERGY INTO USEFUL WORK

(75) Inventors: Georgy Ramasanovich Umarov, Moscow (RU); Sergey Ivanovich Boychenko, Moscow (RU); Shiv Vikram FKhemka, Sachsein (CH)

(73) Assignee: SOLARIS HOLDINGS LIMITED, St. Helier, Jersey, Channel Islands (GB)

( * ) Notice: Subject to any disclaimer, the term of this patent is extended or adjusted under 35 U.S.C. 154(b) by 220 days.

(21) Appl. No.: 14/343,094

(22) PCT Filed: Aug. 28, 2012

(86) PCT No.: PCT/IB2012/001932
§ 371 (c)(1),
(2), (4) Date: Jun. 17, 2014

(87) PCT Pub. No.: WO2013/034976
PCT Pub. Date: Mar. 14, 2013

(65) Prior Publication Data
US 2014/0311145 A1   Oct. 23, 2014

(30) Foreign Application Priority Data
Sep. 7, 2011   (GB) .................................. 1115492.9

(51) Int. Cl.
F03G 7/00   (2006.01)
G21D 9/00   (2006.01)

(52) U.S. Cl.
CPC .................. F03G 7/00 (2013.01); G21D 9/00 (2013.01); Y02E 30/00 (2013.01)

(58) Field of Classification Search
CPC .............. F03G 7/00; G21D 9/00; Y02E 30/00
(Continued)

(56) References Cited

U.S. PATENT DOCUMENTS 2,948,861 A * 8/1960 Babb ......................... H01S 1/06
                                                        330/4
7,640,747 B2 * 1/2010 Umarov .................... G21D 9/00
                                                        60/643
2006/0042248 A1   3/2006 Umarov et al.

FOREIGN PATENT DOCUMENTS

EP   1 580 426 A1   9/2005

OTHER PUBLICATIONS

International Search Report under date of Mar. 25, 2013 in connection with PCT/IB2012/001932.
(Continued)

*Primary Examiner* — Hoang Nguyen
(74) *Attorney, Agent, or Firm* — Quarles & Brady LLP

(57) ABSTRACT

The invention relates to heat power engineering, in particular, to methods that use a working medium for producing useful work from heat of an external source. The method comprises interaction of the working medium with an energy source and interaction of the working medium with an additional low-temperature energy source in the form of the positron state of the Dirac's matter by means of bringing the working medium into quantum-mechanical resonance with said state. The quantum-mechanical resonance is initiated by changing at least one of the thermodynamic parameters of the working medium, while the value of spontaneous fluctuations of the variable parameter in the vicinity of the line of absolute instability in the state diagram of the working medium is predetermined, and the change step for the thermodynamic parameter is set to be lower than the predetermined value of said fluctuations.

2 Claims, 1 Drawing Sheet

(58) Field of Classification Search
USPC .......................................... 60/643, 645, 676
See application file for complete search history.

(56) References Cited

OTHER PUBLICATIONS

Search Report dated Jan. 17, 2012 in connection with GB1115492.9.

* cited by examiner

METHOD FOR CONVERTING THERMAL ENERGY INTO USEFUL WORK

CROSS-REFERENCE TO RELATED APPLICATIONS

This application represents the national stage entry of PCT International Application No. PCT/IB2012/001932 filed Aug. 28, 2012, which claims priority to Great Britain Patent Application 1115492.9 filed Sep. 7, 2011, the disclosures of which are hereby incorporated by reference in their entirety for all purposes.

TECHNICAL ART

The invention relates to heat power engineering, in particular to methods that use a working medium for producing useful work from heat of an external source.

BACKGROUND ART

A method for converting thermal energy of an external source into mechanical work is known (RU, 2078253, F03G7/06, 20.04.97) that increases the efficiency of a thermal generating set up to a value close to unity, i.e. up to complete conversion of heat into mechanical work.

A method is known (RU, 2162161, F03G7/06, 20.01.2001) that provides the highest efficiency of a thermal generating set through complete conversion of the working medium heat generated by an external source into mechanical work. This method comprises interaction of the working medium with the thermal energy source, in particular, imparting thermal energy from the external source to the working medium flow, expansion of the flow by mechanical work, and performing energy exchange with an additional low-temperature thermal energy source, for the purpose of which a part of the general flow of the working medium having an increased density is used. This method actually implements the process of energy transmission inside the system "working medium—additional low-temperature energy source". The method allows achieving the efficiency of thermo-mechanical transformations close to unity and using low-temperature thermal energy sources. However, this is possible only due to the application of a special, rather complex system of recovering thermal energy of the working medium expanded after the mechanical work is performed.

A method is known according to international application WO 2004/046546 (Patent RU, 2213256, F 03G 7/06, 21.11.2002) that is most similar to the one being claimed and that comprises interaction of a working medium with an additional low-temperature thermal energy source in the form of the positron state of the Dirac's matter, said interaction performed by bringing the working medium into quantum-mechanical resonance with said state of matter. The energy transmission according to said method is carried out inside the system "working medium—positron state of the Dirac's matter". The method is based on the comprehension of the positron state of the Dirac's matter disclosed in details in the study "The Principles of Quantum Mechanics by P.A.M", Dirac, Second Edition, Oxford, 1935 [1]. The study asserts that the temperature of the said state of matter is close to −273° C., which allows considering said state as being close to the ideal low-temperature energy source, the so-called "physical vacuum".

Exposures of the working medium needed to create quantum-mechanical resonance cause polarization processes in the positron state of the Dirac's matter and generate two material particles, an electron and a positron, thereby confirming that "the physical vacuum is the fifth state of matter". Further positron and working medium interaction releases energy, including that in the form of heat, which can be converted into useful work.

The mechanism of phase transition of the working medium to the fifth state of matter during the quantum-mechanical resonance process with absorption or emission of a substantial amount of energy is disclosed in the studies "Mechanisms of First-Type Phase Changes in Metals and Semiconductors under the Influence of High Pressure and Electrostatic Field", G. R. Umarov et al., High Pressure Physics and Engineering, 1990, No. 33 [2] and "Theory of Phase Transitions and Structure of Solid Solutions", A. G. Khachaturyan, Moscow, Nauka, 1974 [3].

The above studies point out that in first-type phase transitions there are phase stability fields, in which fluctuations of the positron state of the working medium per se cannot lead to spontaneous creation of positrons and quantum-mechanical resonance with energy generation. The quantum-mechanical resonance occurs in the working medium that is on the verge of stable state and precedes phase transition, the development of which is conditioned by overcoming the state of absolute instability.

However, the process of energy release in phase transition of the working medium overcoming the state of absolute phase instability develops like an avalanche. A short-term energy outbreak occurs, which does not always serve the task of the creators of the heat engine according to this method. In some cases a heat engine is required that performs work in a stable manner during a given period of time including a rather long one.

DISCLOSURE OF INVENTION

The object of this invention is a method for converting thermal energy into useful work with efficiency practically corresponding to theoretical efficiency, during the implementation of which said conversion is carried out in a stable manner and within a rather long period of time by means of initiating phase transition of the working medium on the verge of overcoming the line of absolute phase instability.

The method comprises interaction of the working medium with an energy source and interaction of the working medium with an additional low-temperature energy source in the form of the positron state of the Dirac's matter by means of bringing the working medium into quantum-mechanical resonance with said state. The quantum-mechanical resonance is initiated by changing at least one of the thermodynamic parameters of the working medium. At the same time, the value of spontaneous fluctuations of the variable parameter in the vicinity of the line of absolute instability in the state diagram of the working medium is predetermined, and the change step is set for the thermodynamic parameter to be lower than the value of said fluctuations. In a particular embodiment, the change step of the thermodynamic parameter is adjusted by introducing feedback for at least one of the thermodynamic parameters of the working medium. Therefore, the quantum-mechanical resonance is substantially initiated by means of spontaneous fluctuations of the thermodynamic parameters of the working medium.

Figure 1:
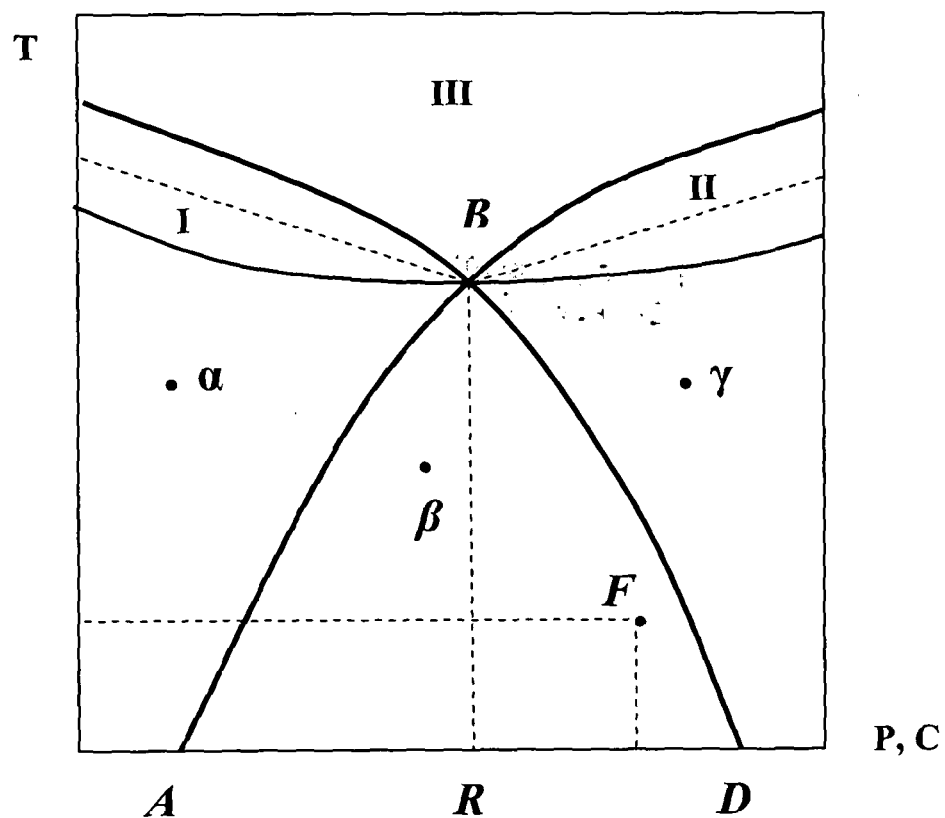
FIG. 1 illustrates a phase diagram of states in the vicinities of the triple point for the selected substrate composition.

The essence of the claimed method can be explained with the help of a state diagram of ternary alloy InSb—TlSb illustrated in FIG. 1 and representing conditions under which different phases of the working medium can coexist.

The state diagram of the working medium of any composition and any state of aggregation can be constructed using computation by adequate software products and based on the known dependence of chemical potentials of all working medium components on temperature, pressure and composition of the phases. The state diagram can also be constructed experimentally with the use of data provided by thermal, microstructural or X-ray diffraction methods.

In the phase diagram illustrated in FIG. 1, BR in the equilibrium line of phases I and II in coordinates P and T (pressure and temperature of the working medium, respectively) or T and C (temperature and chemical composition); BD line is the line of absolute instability of phase I with respect to phase II; AB line is the line of absolute instability of phase II with respect to phase I. If the system is under conditions corresponding to point α, phase II nuclei cannot exist because when the system returns to equilibrium conditions, fluctuational reaching of the BD line brings the nucleus across AB. The same pertains to conditions corresponding to point γ—here, phase I nuclei cannot exist. There may be phase nuclei under conditions of β; in this case, the relative quantity of phases in their coexistence region ABD (absolute instability triangle) is inversely proportional to the distance of point β from AB and BD. Therefore, in the phase coexistence region a nucleus can be generated not of any phase, but only of those phases which are correspondingly interconnected by lines of absolute instability.

Apparently, useful energy release becomes an irreversible process when the line of absolute instability is overcome. Reaching the quantum-mechanical resonance is thus advisably performed with accuracy of a small vicinity of the line of absolute instability, which is possible at very small increments of thermodynamic parameter values of the working medium, namely those that do not exceed the values of the spontaneous fluctuations of said parameter near the line of absolute instability.

According to the laws of thermodynamics and statistical physics, any heat engine provides possibility for adjusting only time-averaged thermodynamic parameter values of the working medium. Statistical physics describes instantaneous values that determine fluctuations (deviations from mean) by the following formula:

$$d\omega = \frac{1}{\sqrt{2\pi(\Delta V)^2}} e^{-\frac{(V-V_0)^2}{2(\Delta V)^2}} dV,$$

and for ideal gases:

$$\overline{\Delta V^2} = \frac{V^2}{N},$$

where:
$\overline{\Delta V^2}$ —root-mean-square fluctuations of the working medium volume;
$d\omega$—probability density of mean-square fluctuations of the working medium volume V—instantaneous medium volume
$V_0$—average medium volume at given T and P
N—number of ideal gas particles within the volume The above formula demonstrates the quantitative characteristic of fluctuations in the volume of the substance forming the working medium. For a solid body, the formula has a qualitative character.

For example, for an ideal gas, $N=6.10^{23}$ and V=22 liters at T equal to room temperature and P equal to 1 atmosphere. Therefore, the root-mean-square value of fluctuations is $10^{-23}$ (V. G. Levich "Theoretical Physics. V. 2. Statistical Physics Electromagnetic Processes in Matter", Amsterdam: North-Holland Publ., 1970 [4]). Fluctuations of physical quantities describing the state of a system are evidently small and may be neglected. However, the author of the quantitative theory of phase transitions, US physicist Kenneth Wilson, who was awarded the Nobel Prize for creating the theory for critical phenomena in connection with phase transitions, has demonstrated that a complex nonlinear medium in the vicinity of a critical point is subjected to fluctuations of different scales, from atomic dimensions to characteristic dimensions of the entire system ("Theory for Critical Phenomena in Connection with Phase Transitions", Nobel Lectures in Physics 1981-1990, edited by Gösta Ekspond, ISBN: 978-981-02-0728-1 [5]). The values of "gigantic" fluctuations of each of the thermodynamic parameters in the vicinity of the line of absolute instability may exceed the above-mentioned theoretical values by several orders, and their effect upon the properties of the medium becomes a determining factor.

In a number of experiments conducted by the authors of this invention, the range of values of "gigantic" thermodynamic parameter fluctuations of the working medium was estimated as $10^{-2}$ . . . $10^{-6}$.

It is this property of fluctuations that enables using them to initiate quantum-mechanical resonance and carry out phase transitions of the working medium with performance of useful work.

The state of absolute phase instability is intrinsic to any state of aggregation of a substance forming the working medium, i.e. phase transition conditions are valid for solid, liquid, gaseous substances and plasma.

BEST MODE FOR CARRYING OUT THE INVENTION

The claimed method may be implemented, for example, in a heat engine in which the working medium (hereinafter called the substrate) may be, for example, InSb—TlSb alloy in the state of interaction with a thermal energy source.

Figure 2:
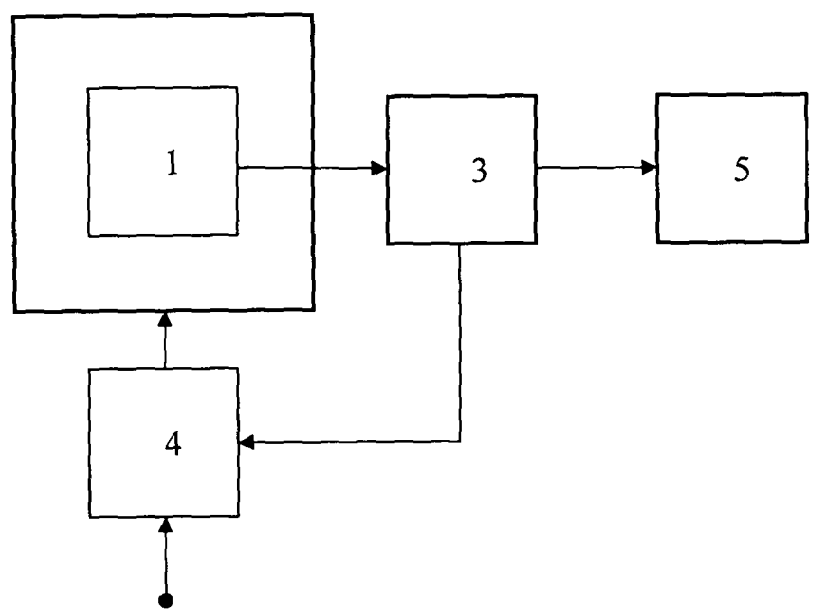
FIG. 2 illustrates a functional diagram of a heat engine simulating set.

The functional diagram of a heat engine simulating set is given in FIG. 2.

It comprises a target object—substrate 1 positioned in a thermostat 2 with a temperature and pressure controller, an apparatus 3 monitoring the state of the substrate (temperature, pressure, chemical and spectral composition, external fields, thermal capacity, thermal and electrical conductivities) with high accuracy, and an automatic control system 4 for controlling the variable parameter, which includes sensors of the value of the parameter being measured or of its change rate, and a data-processing device 5. The target object is a substrate in the form of the above-mentioned InSb—TlSb alloy in a state close to phase transition. Near the dielectric-metal phase transition, the state of the substrate is determined by proportions of its constituent elements selected according to a technique described in the study "Structural Stability and Trends in Band Structures of Covalent-Ionic Compounds", Altshuler A. M., Vekilov Y. K., Umarov G. R., Pfys. Stat., sol (B)—1975—69, No. 2—pp. 661-670 [6].

A phase diagram of states in the vicinities of the triple point is constructed for the selected substrate composition. The value of fluctuations in the vicinity of the line of absolute instability is determined by calculations or experimentally. The temperature of the substrate, as one of the thermodynamic parameters, is set to be close to the point of the expected phase transition in compliance with the state diagram. Fluctuations of the basic thermodynamic parameters of the substrate as a system can be calculated by formulae derived and justified in publication: L. D. Landau, E. M. Lifshitz "Course of Theoretical Physics, Statistical Physics", Vol. 5 ($3^{rd}$ ed), Butterworth-Heinemann, ISBN: 978-0-750-63372-7 [7].

$$\overline{\Delta V^2} = -kT\left(\frac{\partial V}{\partial p}\right)_T,$$

$$\overline{\Delta T^2} = -\frac{kT^2}{C_v}$$

$$\overline{\Delta p^2} = \frac{kT}{\left(\frac{\partial V}{\partial p}\right)_s}$$

$$\overline{\Delta S^2} = kC_p$$

The parameters are designated in the formulae as follows:
V—volume of the substrate, p—pressure, T—temperature, $C_v$—thermal capacity at a constant volume, $C_p$—thermal capacity at a constant pressure, S—entropy, k—Boltzmann constant.

The values of fluctuations can be determined experimentally with the help of the method of photometric diagnostics of phase transition based on changes in the optical properties of the substrate. The method comprises sensing the brightness spectra of external source light reflected from the substrate surface and subjecting the spectra to comparative computer analysis. A database is formed according to the analysis results, which includes the dependence of the spectral brightness density on the values of one of the thermodynamic parameters (temperature in the given example), and boundary values of the parameter are determined at the beginning of phase transition. Measurements are taken at different points of time, and the mean squared deviation of the thermodynamic parameter value from the nominal value is used as a variable characterizing the fluctuation level. The quantum-mechanical resonance with heat release can also be detected experimentally from abrupt changes in thermal or electric conductivities of the substrate. These phenomena accompany the occurrence of the quantum-mechanical resonance as of a state preceding phase transition in the substrate.

At fixed atmospheric pressure and temperature values within instrumental tolerances, the phase state of the substrate correspondents to point F in the phase diagram (FIG. 1). When an estimated value of the variable parameter (temperature in this case) is achieved at a step not exceeding a predetermined value of fluctuations, phase transition is initiated in a small volume of the substrate. Further changes in the fluctuating volume of the substrate, which increases as the phase (point F) approximates the state of absolute instability (BD line), may be used as well as temperature fluctuations to perform feedback for the adjustable parameter, which in this case is temperature.

The equation of state known from statistical physics (for an ideal gas):

PV=RT, where: P, V, T—parameters of the working medium
R—gas constant, demonstrates that when the value of one parameter fluctuates, fluctuations of the other parameters occur inevitably, and thus the feedback may be formed as well by using pressure changes of the substrate that accompany phase transformation, or generated quanta of external fields.

The above-mentioned regulation of the variable parameter change step provides smooth approaching of the phase transition state by the substrate with initiation of quantum-mechanical resonance and avoiding its avalanche-type development.

The phase transition process can be initiated by changing another thermodynamic parameter—pressure. In this case, the above-mentioned target object may be positioned under a press, while the pressure change step required for smooth overcoming of the line of absolute instability is also determined by the method described above.

Precise adjustment of the thermodynamic parameter (temperature in this case) in the vicinity of the line of absolute phase instability can be provided by introducing feedback for the adjustable parameter with the help of a control signal proportional to the predetermined root-mean-square value of fluctuations of the variable parameter itself and of accompanying fluctuations of the other thermodynamic parameters of the working medium.

For any thermodynamic parameter, fluctuations of this order converted into electrical fluctuations can be measured both by the oscillographic method and by gauges of electromagnetic and electrodynamics systems.

Thus, the claimed method converts thermal energy into useful work with the efficiency close to the theoretical one, using in-depth processes in the working medium without application of highly technical energy recovery systems, stabilizes operation of a heat engine in time, and expands the range of useful work obtained through its implementation.

Implementation of the claimed method may produce the following effects as collateral ones:
nuclear transmutation of substance
possible energy transmission to specified distances
creation of gravitational propulsion, which confirms the connection between electromagnetic and gravitational interactions.

INDUSTRIAL APPLICABILITY

The claimed method can be used in the industry that requires significant power consumptions during long periods of time, for example, in non-ferrous metal industry, where 80% of the product cost is the cost of the power consumption with simultaneous cooling of hot shops in hazardous production facilities. The method can also be used to create a highly efficient energy source in the transport sector, and in a number of other industries mentioned above.

The invention claimed is:
1. A method for converting thermal energy into useful work, the method comprising interacting a working medium with an energy source and interacting the working medium with an additional low-temperature energy source, which is in the positron state of the Dirac 's matter by means of bringing the working medium into quantum-mechanical resonance with said additional low temperature energy source, wherein the quantum-mechanical resonance is initiated by changing at least one of the thermodynamic parameters of the working medium, while the value of spontaneous fluctuations of the variable parameter in the vicinity of the line of absolute instability in the state diagram is predetermined, and the change step for the thermodynamic parameter is set to be lower than the predetermined value of said fluctuations.

2. The method of claim 1, wherein the change step of the thermodynamic parameter is adjusted by introducing feedback for at least one of the thermodynamic parameters of the working medium.

\* \* \* \* \*